United States Patent
Pescod et al.

(10) Patent No.: US 9,954,616 B2
(45) Date of Patent: Apr. 24, 2018

(54) FIBRE-RADIO COMMUNICATION NETWORK AND APPARATUS AND FIBRE-RADIO COMMUNICATION METHOD

(71) Applicant: BAE Systems plc, London (GB)

(72) Inventors: Christopher Ralph Pescod, Chelmsford (GB); Shahbaz Nawaz, Chelmsford (GB); Mark Trevor Newman, Chelmsford (GB)

(73) Assignee: BAE Systems plc, London (GB)

( * ) Notice: Subject to any disclaimer, the term of this patent is extended or adjusted under 35 U.S.C. 154(b) by 15 days.

(21) Appl. No.: 15/120,006

(22) PCT Filed: Feb. 17, 2015

(86) PCT No.: PCT/GB2015/050442
§ 371 (c)(1),
(2) Date: Aug. 18, 2016

(87) PCT Pub. No.: WO2015/128611
PCT Pub. Date: Sep. 3, 2015

(65) Prior Publication Data
US 2017/0054503 A1    Feb. 23, 2017

(30) Foreign Application Priority Data

Feb. 25, 2014  (EP) .................................... 14275030
Feb. 25, 2014  (GB) .................................... 1403250.2

(51) Int. Cl.
*H04B 10/2575*    (2013.01)
*H04W 88/08*      (2009.01)
*H04B 10/40*      (2013.01)

(52) U.S. Cl.
CPC . *H04B 10/25752* (2013.01); *H04B 10/25753* (2013.01); *H04B 10/40* (2013.01); *H04W 88/085* (2013.01)

(58) Field of Classification Search
CPC ................................. H04B 10/2575–10/25759
(Continued)

(56) References Cited

U.S. PATENT DOCUMENTS 9,037,143 B2 *   5/2015  Berlin .............. H04B 10/25758
                                                    455/450
9,258,052 B2 *   2/2016  George ................ H04B 7/0413
(Continued)

FOREIGN PATENT DOCUMENTS

DE    102010044236 A1    3/2012
WO    2013156585 A1      10/2013

OTHER PUBLICATIONS

PCT Search Report and Written Opinion for PCT Application No. PCT/GB2015/050442, dated Apr. 9, 2015, 15 pages.
(Continued)

*Primary Examiner* — Li Liu
(74) *Attorney, Agent, or Firm* — Maine Cernota & Rardin

(57) ABSTRACT

A fiber-radio communication network includes a base station (300) and wireless access nodes (100) coupled by fiber optic cables (125). The base station (300) includes a switch module (320) arranged to switch Ethernet signals on a local area network, and a media converter rack module (310) comprising media converter units MC1-MC6 arranged to convert between a baseband Ethernet signal carried by the fiber optic cables (125) and an Ethernet digital signal for the switch. The wireless access node (100) comprises a media converter module (120) which converts between a baseband Ethernet signal carried by the fiber optic cables and an Ethernet digital signal; and a wireless access point module (110) comprising a local modem which converts between the Ethernet digital signal received over the fiber optic cables and a wireless transmission in a 60 GHz range for wireless (Continued)

communication with a client terminal (400) in the vicinity of the wireless access node (100).

14 Claims, 3 Drawing Sheets

(58) Field of Classification Search
USPC .................................. 398/66, 67, 115–117
See application file for complete search history.

(56) References Cited

U.S. PATENT DOCUMENTS

| | | | | |
|---|---|---|---|---|
| 2010/0189439 | A1* | 7/2010 | Novak | H04L 12/2898 398/67 |
| 2013/0150063 | A1* | 6/2013 | Berlin | H04B 10/25758 455/450 |
| 2015/0003565 | A1* | 1/2015 | George | H04B 7/0413 375/299 |
| 2016/0094298 | A1* | 3/2016 | Isfeldt | G01V 1/226 398/104 |
| 2016/0241339 | A1* | 8/2016 | Berlin | H04B 10/2575 |

OTHER PUBLICATIONS

M-T Zhou et al: "Radio-over-Fiber Transmission of 1.25-Gigabit Ethernet Signal on 68-GHz Band Subcarrier with Performance Improvement and Wavelength Reuse", Proceedings of the 2007 IEEE International Conference on Communications (ICC 2007), Jun. 24-28, 2007, Glasgow, UK, IEEE, Piscataway, NJ, USA, Jun. 1, 2007, pp. 2151-2155, XP031125995, ISBN: 978-1-4244-0353-0.
EP Search Report for EP Application No. 14275030, dated Jul. 28, 2014, 12 pages.
GB Search Report for GB Application No. 1403250.2, dated Aug. 11, 2014, 7 pages.
Ohata, K, "Millimeter-Wave Broadband Transceivers", NEC J of Adv. Tech., Summer 2005. Downloaded from http://www.nec.com/en/global/techrep/journal/g05/n03/pdf/a211.pdf on Aug. 25, 2014. See Section 6, Fig. 12 and Photo 1.
Racmachandran, S, "Fiber Backhaul for WiFi and Small Cell Networks", Aug. 25, 2013. Downloaded from https://www.bicsi.org/pdf/presentations/fall_13/Fiber%20Backhaul%20for%20Small%20Cells%20-%20Sankar%20Ramachandran%20-%20Omnitron.pdf on Aug. 7, 2014. See slides 11, 12 and 14.
Mondo Plast, "Router Wireless 802.11n, slot SFP, switch 4-port". Downloaded cached version cached on Aug. 26, 2013 from http://web.archive.org/web/20130510200243/http://www.perle.com/products/techspecs/Media-Converter-19-Slot-Chassis-diagrams.shtml on Aug. 7, 2014. See "Application" Section.
Dell, "Dell Wireless Dock D5000 User Manual", Feb. 2013. Downloaded from ftp://ftp.dell.com/Manuals/all-products/esuprt_electronics/esuprt_docking_stations/dell-wir-dck_User's%20Guide2_en-us.pdf on Aug. 6, 2014. See sections 1.3 and 3.2.1.
Perle, "MCR1900 Media Converter Chassis—Application Diagrams". Cached version cached on May 10, 2013 downloaded from http://web.archive.org/web/20130510200243/http://www.perie.com/products/techspecs/Media-Converter-19-Slot-Chassis-diagrams.shtml on Aug. 7, 2014. Note in particular the section entitled "High Density Fiber Distribution from UTP Switch Equipment at Corporate Headquarters".
Chen, T, "Wireless Gigabit Ethernet Extension", Proc of 2nd International Conference on Broadband Networks, Oct. 3-7, 2005, pp. 458-466. See Abstract, Figs 1 and 2 and Sections III.A and III.B.
International Preliminary Report on Patentability for PCT Application No. PCT/GB2015/050442, dated Jul. 27, 2016, 14 pages.

* cited by examiner

FIBRE-RADIO COMMUNICATION NETWORK AND APPARATUS AND FIBRE-RADIO COMMUNICATION METHOD

RELATED APPLICATIONS

This application is a national phase application filed under 35 USC § 371 of PCT Application No. PCT/GB2015/050442 with an International filing date of 17 Feb. 2015 which claims priority of GB Patent Application 1403250.2 filed 25 Feb. 2014 and EP Patent Application 14275030.6 filed 25 Feb. 2014. Each of these applications is herein incorporated by reference in their entirety for all purposes.

FIELD OF THE DISCLOSURE

The present invention relates in general to the field of wireless data communications. More particularly, the present invention relates to a fibre-radio communication apparatus and network, and a fibre-radio communication method.

BACKGROUND

It is known to provide local area wireless data communications in a computer network, such as the 2.4 GHz 1/"WiFi" communications set out in the family of standards collectively published as IEEE 802.11. These wireless communications standards have progressively improved from version 11b (10 Mbit/s) through to version 11n (100 Mbit/s), each of which has increased the range and data rate of the wireless local area network. As a result, these wireless communications standards are now ubiquitous for both domestic and commercial uses.

More recently, further developments have introduced a new standard IEEE 802.11ac approved in January 2014 using the 5 GHz band for higher-throughput local areas networks with data rates approaching 1.3 gigabit per second (1.3 Gbit/s) when using a 160 MHz bandwidth channel. However, only two such channels are available within the permitted 5 GHz band.

There is still an increasing need to provide high data rate communications in wireless local area networks and to support a larger number of channels. It is desired to provide multi-gigabit data rates well in excess of 1.3 gigabit per second (e.g. greater than 2 Gbit/s, or greater than 5 Gbit/s).

There is a need to provide a local area wireless communication network which can simultaneously support many tens or hundreds of client terminals, and which can deliver the desired high data rate to each such client terminal device.

There is a further need to provide a communication network operable in a dense modular environment, such as an office block or a ship or other vessel, having many users in close proximity to each other. Typically, this dense modular environment comprises many separate rooms, cells or compartments.

In many cases, there is a further need to increase security of the data communication network, particularly in relation to the wireless communications. In particular, it is desired to reduce opportunities for eavesdropping or other unauthorised access to the wireless communications.

The example embodiments address at least some of these problems and/or may address other problems in the art as will be appreciated from the teachings herein.

SUMMARY

According to the present invention there is provided a fibre-radio communication apparatus, network and communication method as set forth in the appended claims. Other, optional, features of the invention will be apparent from the dependent claims, and the description which follows.

There now follows a summary of various aspects and advantages according to embodiments of the invention. This summary is provided as an introduction to assist those skilled in the art to more rapidly assimilate the detailed discussion herein and does not and is not intended in any way to limit the scope of the claims that are appended hereto.

In one example there is provided a fibre-radio communication network, comprising: a base station; and at least one wireless access node which is coupled to the base station by one or more fibre optic cables; wherein the base station comprises: a switch module arranged to switch Ethernet signals on a local area network; and a media converter rack module comprising a plurality of media converter units each being arranged to convert between a baseband Ethernet signal carried by the fibre optic cables and an Ethernet digital signal for the switch; and wherein the wireless access node comprises: a media converter module which converts between a baseband Ethernet signal carried by the fibre optic cables and an Ethernet digital signal; and a wireless access point module comprising a local modem which converts between the Ethernet signal received over the fibre optic cables and a wireless transmission in a 60 GHz range for wireless communication with a client terminal in the vicinity of the wireless access node.

In one example, the wireless access node comprises a housing which contains the media converter module and the wireless access point module together as a single unit. In one example, the housing comprises a transmissive window for transmission of the wireless transmissions in the 60 GHz range. In one example, the wireless access point module is arranged in the housing to align with the transmissive window while being separated from the transmissive window by a gap.

In one example, the wireless access node further comprises an internal cable between the media converter module and the wireless access point module.

In one example, the media converter module and the wireless access point module are constructed together as an integrated unit.

In one example, the wireless access node provides wireless communications at a centre frequency in the range 57 to 66 GHz.

In one example, the base station further comprises a housing arranged to house the media converter rack module and the switch module together as a single unit.

In one example the network includes a management terminal arranged to interrogate a status of the media converter units and to control management functions of the media converter units.

In one example, the management terminal is further arranged to interrogate a status of the media converter modules in one or more of the wireless access nodes.

In one example there is provided a fibre-radio communication apparatus configured as a wireless access node for one or more client terminals, the apparatus comprising: a media converter module coupled in use to one or more fibre optic cables which converts between a baseband Ethernet signal carried by the fibre optic cables and an Ethernet digital signal; and a wireless access point module comprising a local modem which converts between the Ethernet signal received over the fibre optic cables and a wireless transmission in a 60 GHz range for wireless communication with the one or more client terminals in the vicinity of the apparatus.

In one example, the media converter module and the wireless access point module are integrated together as a single unit.

In one example there is provided a fibre-radio communication method, comprising: installing a base station and at least one wireless access node which is coupled to the base station by one or more fire optic cables; wherein the base station comprises: a switch module arranged to switch Ethernet signals on a local area network; and a media converter rack module comprising a plurality of media converter units each being arranged to convert between a baseband Ethernet signal carried by the fibre optic cables and an Ethernet digital signal for the switch; and wherein the wireless access node comprises: a media converter module which converts between a baseband Ethernet signal carried by the fibre optic cables and an Ethernet digital signal; and a wireless access point module comprising a local modem which converts between the Ethernet digital signal received over the fibre optic cables and a wireless transmission in a 60 GHz range for wireless communication with a client terminal in the vicinity of the wireless access node.

In one example the method includes providing the plurality of wireless access nodes for wireless communication in a 60 GHz range with the one or more client terminals in use during a construction phase of a dense modular environment; and during a commissioned phase of the dense modular environment, providing the plurality of wireless access nodes each in a separable compartment of the dense modular environment for wireless communication in a 60 GHz range with one or more client terminals in that compartment. In one example the method includes providing boundaries of the compartment which confine a wireless coverage area of the wireless access node in use within the compartment.

BRIEF DESCRIPTION OF THE DRAWINGS

For a better understanding of the invention, and to show how example embodiments may be carried into effect, reference will now be made to the accompanying drawings in which.

DETAILED DESCRIPTION

At least some of the following example embodiments provide an improved network architecture for fibre-radio communications. Advantageously, at least some of the example embodiments provide an improved wireless node apparatus for use in a radio-fibre communication network. Many other advantages and improvements will be discussed in more detail herein.

Figure 1:
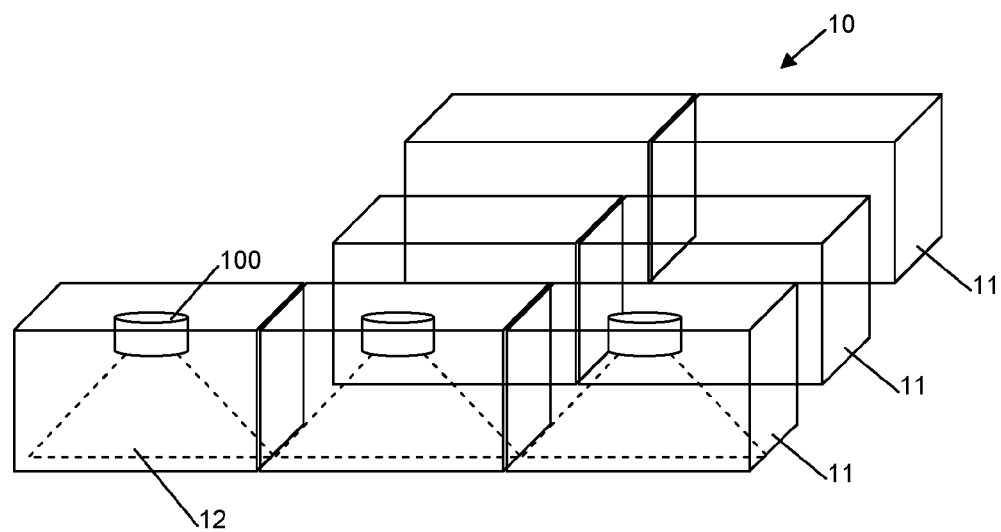
FIG. 1 is a schematic view of a dense modular environment in which the example embodiments may be applied.

FIG. 1 is a schematic view of a dense modular environment in which example embodiments of the network architecture may be applied. The environment 10 includes a plurality of compartments 11, each of which provides a spatial volume for one or more users. For example, the modular environment 10 is an office complex and each of the compartments 11 is an office. As another example, the environment is a vessel, such as a ship, and the compartments 11 are separable compartments within the vessel. Many other dense modular environments will be apparent to the skilled person.

As shown in FIG. 1, each compartment 11 is provided with a respective wireless access node 100. As an example, each node 100 may be mounted on a ceiling or wall of the respective compartment 11. In use, the node 100 has a coverage area for a wireless transmission generally indicated by the dotted lines 12. The wireless access node 100 is arranged to send and receive wireless signals over a relatively short range, such as up to 5 meters or up to 10 meters in line of sight from the node. The node 100 may not project the wireless signal with a universal distribution. Instead, the node may project the wireless signal over a generally conical area, such as elevation and azimuth scan angles of about +/−30 degrees or +/−60 degrees. The wireless coverage area 12 suitably extends throughout the respective compartment 11. As will be discussed in more detail below, the wireless coverage of each node 100 normally does not extend beyond the respective compartment 11. In particular, the wireless coverage area 12 is limited at 60 GHz by absorption/reflections of the signal by the walls. Walls of brick or other dense materials will heavily attenuate the transmission of the signal, while in a room with metal walls (such as in a ship) the 60 GHz signal will be reflected off the walls and back into the compartment. These reflections can be used to advantage to provide non line of sight propagation if the direct beam from the node to the mobile terminal is blocked.

Figure 2:
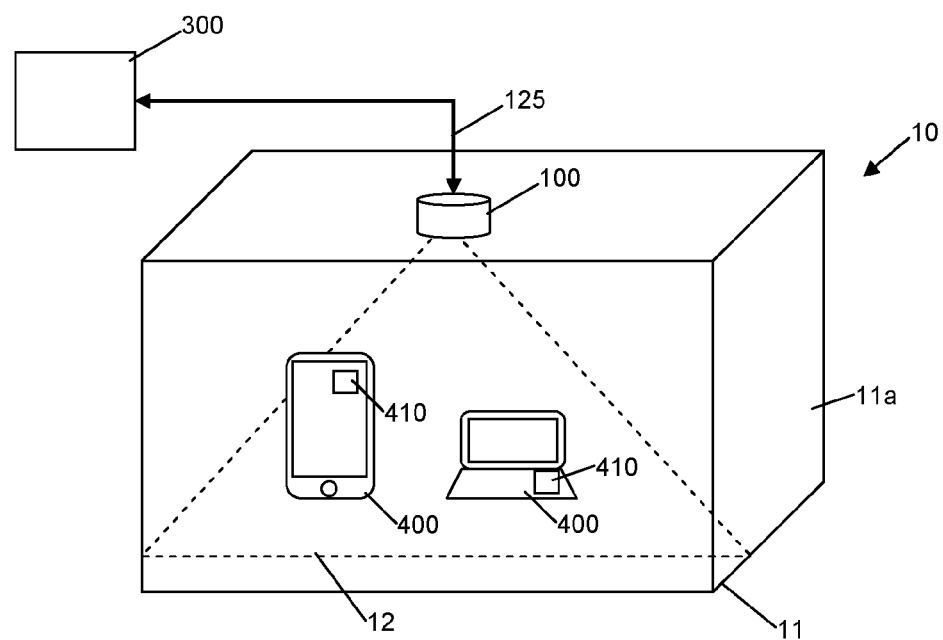
FIG. 2 is a further schematic view of the environment in which the example embodiments may be applied.

FIG. 2 is a further schematic view of the environment in which the example embodiments may be applied. As shown in FIG. 2, the wireless access node 100 is suitably located within the compartment 11 to generate a wireless coverage 12 that substantially fills the compartment 11 or at least a significant working volume within the compartment 11. Also, located within the compartment 11 are one or more terminal devices 400, here illustrated by a laptop computer and a tablet or other portable computing device. Each client terminal 400 suitably includes a wireless transceiver 410 illustrated schematically in FIG. 2 which communicates wirelessly with the wireless access node 100. Further, the or each such wireless access node 100 is connected to one or more base stations 300 by at least one fibre optic cable 125. Suitably, each base station 300 is coupled to a plurality of the wireless access nodes 100 each by respective fibre optic cables 125.

As shown in FIG. 2, each compartment 11 includes boundary dividers 11a such as walls, floors, ceilings and so on. Typically, the boundaries 11a are sufficient to contain the wireless coverage 12 from the wireless access node 100 within the respective compartment 11.

In one example, the wireless access node 100 operates at a centre frequency in the range between approximately 57 to 66 GHz (for Europe—with other regions may have slightly different frequency allocations with in this general range). Conveniently, this range is generally termed the 60 GHz range or 60 GHz band. The client wireless transceiver 410 within the client terminal 400 is likewise configured to operate at the same respective centre frequency.

In one example, each compartment 11 has a floor area in the range of approximately 5-20 meters squared. For a ceiling height of approximately 2.6 meters, each compartment 11 has a volume in the range of about 12-50 meters cubed. Typically, 60 GHz wireless links as may be used in the example embodiments have a direct line of sight range of about 5 meters to about 10 meters, which is consistent with the volumes in volume of the modules in the example embodiments. Thus one wireless access node 100 is sufficient typically for each compartment 11.

In use, the client wireless transceiver 410 in the client terminal 400 is brought within range of the wireless access node 100 and association is performed to establish a link between these two devices. Once associated, data can be communicated between the client terminal 400 and the wireless access node 100. As discussed in more detail below, the wireless access node 100 then provides a data connection for the client terminal 400 to the base station 300 and, via the base station 300, to other client terminals connected to the network.

Figure 3:
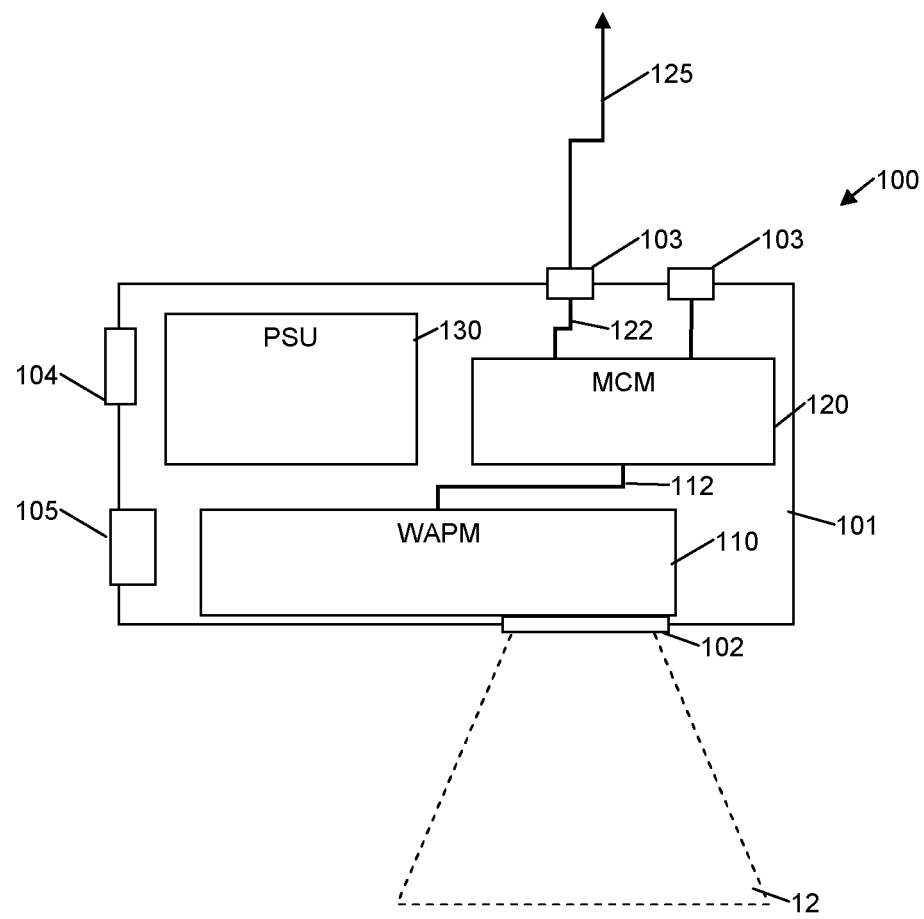
FIG. 3 is a schematic diagram of an example wireless access node apparatus.

FIG. 3 is a schematic diagram showing an example embodiment of the wireless access node 100 in more detail. As shown in FIG. 3, the wireless access node 100 comprises a wireless access point module WAPM 110, a media converter module MCM 120, and a power supply unit PSU 130, A housing 101 of any suitable shape and dimensions is provided which contains the modules 110-130. The housing 101 may be provided with a transmissive window 102 through which the 60 GHz wireless signal is sent and received. The housing 101 also suitably includes one or more optical connector ports 103 allowing the housing 101 to be coupled to the optical cable 125 by any suitable removable connector. In one example, the wireless access node 100 suitably comprises two such optical connector ports 103.

The access point module 110 is configured to send and receive wireless signals in the 60 GHz range through the wireless transmission port 102 to reach the client terminal 400 as discussed above. Suitably, the wireless access point module 110 is configured to send and receive wireless signals according to IEEE 802.11ad standard. The IEEE 802.11 WiFi standards have been updated to in IEEE802.11ad also known as WiGig. This standard provides for operation in the 60 GHz band (e.g. 57 to 66 GHz) and provides per-channel data rates up to 7 Gigabit per second.

Conveniently, the wireless access point module 110 is located within the housing 100 so as to align with the transmissive window 102. The wireless access point module 110 may be separated from the transmissive window 102 by a gap of about 1-2 mm. This gap between the antenna in the wireless access point 110 and the transmissive window 102 may advantageously minimise back reflections or mismatching to the impedance of the antenna.

The wireless access point module 110 comprises, inter alia, a local modem which converts an incoming baseband Ethernet digital signal into a wireless transmission in the 60 GHz range, and vice versa. Thus, coherent signals are not required across the optical cables 125.

The wireless access module 110 is coupled to the media convertor module 120 by an internal cable 112. In one example, the internal cable 112 is a twisted pair electrical cable terminated by RJ45 connectors into each of the wireless access module 110 and the media convertor module 120. The internal linking cable 112 carries an Ethernet digital signal between the wireless access module 110 and the media convertor module 120.

The media convertor module 120 is connected to the optical connector port 103 by an internal optical link cable 122. The internal optical link cable 122 carries an optical signal between the media convertor 120 and the optical cable 125. The optical link cable 122 suitably carries an Ethernet optical signal.

The media convertor 120 is suitably an Ethernet media convertor. The media convertor 120 converts an Ethernet signal carried as a baseband signal on the optical cables 125, 122 into an Ethernet digital signal carried by the internal twisted-pair link cable 112. Thus, the media convertor module 120 is configured to convert an Ethernet signal provided over the optical fibre cable 125 into a digital Ethernet signal, and vice versa.

The power supply unit 130 is arranged to receive a suitable power supply input (e.g. a mains ac power supply) and provide power to the other modules. Suitably, the PSU receives a 240V/50 Hz mains power input and provides a 9V dc local power output. The housing 101 of the wireless access module 100 may further include a one or more power connectors 104. The power connector 104 connects the power supply unit 130 to an external power source (not shown) such as a mains power supply. One or more cooling fans 105 may be provided which received power from the power supply unit 130 and cool the interior components of the housing 101 in use.

In one example, the wireless access module 110 and the media converter module 120 are constructed and integrated together in a single unit, thus avoiding the need for the internal electrical linking cable 112. Here, the combined wireless access and media converter module is configured to directly receive the optical cable 125 via the internal optical linking cable 122. The integrated module performs media conversion from the optical fibre Ethernet baseband signal to the Ethernet digital signal, and then performs local modulation and demodulation to produce the 60 GHz wireless signal sent and received through the transmission window 102. Advantageously, the integrated module further reduces the size of the wireless access node 100, allowing for a smaller and neater housing 101.

Figure 4:
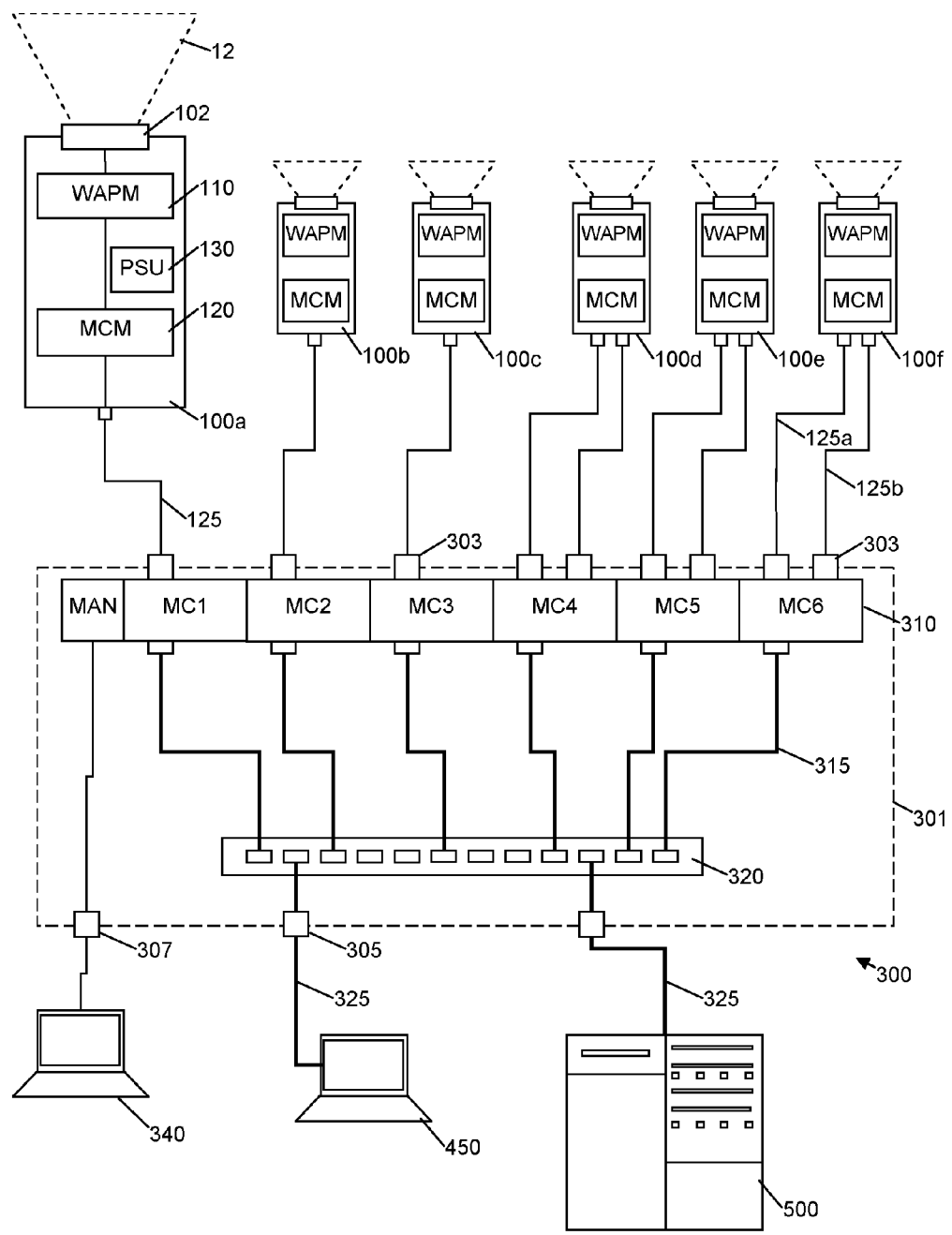
FIG. 4 is a schematic view of a fibre-radio communications network architecture according to an example embodiment.

FIG. 4 is an example embodiment of a fibre-radio communications network architecture.

As shown in FIG. 4, the example embodiment includes a plurality of wireless nodes 100, and at least one base station 300. In this example, six wireless nodes 100a-100f are shown, each of which is constructed as described above.

The base station 300 may be provided within a base station housing 301. The housing 301 comprises a plurality of optical ports 303. Each optical port 303 is arranged to detachably connect to a respective optical cable 125. The housing 301 may further comprise one or more Ethernet connector ports 305 which are suitably RJ45 Ethernet connectors. The Ethernet connectors 305 allow the base station 300 to be coupled externally to an Ethernet network 325 as will be familiar to those skilled in the art. Thus, the base station 300 may be coupled by the fixed Ethernet local area network 325 to other computing equipment such as one or more client terminals 450, one or more servers 500, and so on.

The base station 300 comprises a media converter rack module 310 and a switch module 320. In this example, the media converter rack module 310 comprises six individual media converter units MC1-MC6. Each media converter unit MC1-MC6 within the media converter rack 310 is arranged to convert a baseband Ethernet signal carried by the optical fibre 125 to an Ethernet digital signal carried by an internal link cable 315 to the switch 320.

The media converter rack 310 may include a management module MAN which is electrically connected to a management port 307 of the housing 301. A management terminal 340 may thus be connected to the media converter rack 310 in order to interrogate the status of the media converter modules MC1-MC6 and perform management functions. In one example, the same management computer 340 is arranged to interrogate the status of the media converter modules MCM 120 in one or more of the remote wireless nodes 100a-100f.

In one example embodiment, the network architecture shown in FIG. 4 is particularly useful during a construction phase of the dense modular environment 10. That is, one or more base stations 300 may be located at suitable locations within or remote from the environment being constructed. The optical fibre cables 125 then link the base station 300 with the one or more wireless access nodes 100.

The same network architecture may be used both during the construction phase of the environment 10 and later may continue after the environment 10 is commissioned for normal use. Thus, the dual purpose network architecture has significant cost saving potential.

In the example embodiments, each wireless transmission node 100 is capable of supporting data communications on the air interface of up to 7 Gbit/s by using a IEEE802.11ad/WiGig compliant transmit/receive module. Conveniently, the media converter module 120 carries a 10 Gbit/s Ethernet link between the wireless nodes 100 and the base station 300. The 10 Gbit/s Ethernet link thus ensures that the 7 Gbit/s wireless link is not restricted by upstream network components.

Each node 100 allows secure short range wireless data communications with appropriate client terminals 400 as described above. Very conveniently, the optical fibre cables 125 are relatively small and lightweight. The optical cables 125 may traverse relatively large distances with minimal signal losses. As such, the optical cables are ideally suited for use on a construction site where the base station 300 may have to be relatively remote from the nodes 100. Further, despite the signal path length of the optical cables 125, these optical cables are relatively robust and resistant to electromagnetic interference. It is to be expected during construction that large equipment is in use and that electromagnetic interference is relatively strong from many differing sources. However, the network architecture shown in the example embodiments is able to be used with confidence and provides reliable communications even in this aggressive environment.

As a further advantage, the 60 GHz wireless transmissions are only viable over a relatively short range. In particular the signal is heavily attenuated by oxygen absorption in the atmosphere, especially when compared to the more widely used 2.4 GHz or 5 GHz band wireless signals. The 60 GHz signal is heavily attenuated by boundaries such as walls and thus does not propagate within the environment 10. As such, the wireless coverage area 12 can be closely controlled. It is therefore relatively difficult for unauthorised equipment to access the wireless transmissions, such as by eavesdropping. Further, wireless transmissions can be contained within the volume of the respective compartment 11 effectively providing a screened room by completing the relevant boundaries 11a, i.e. simply by closing the door of the compartment.

The 60 GHz wireless transmission network may adopt protocols such as IEEE 802.11ad which provide internationally standardised communication protocols. As a result, components within each module are increasingly commercially available, allowing the modules to be constructed using lower cost components.

Typically, optical fibre cables are smaller and lighter in weight than twisted pair cables of equivalent capacity. The use of optical fibre links 125 between the wireless nodes 100 and the base station 300 increases the distance or separation between the two components, especially when compared with using twisted pair Ethernet cabling. Further, the optical fibre links 125 improve immunity to electromagnetic interference.

As shown in FIG. 4, one or more of the wireless nodes 100 may be connected to the base station 300 using a pair of optical fibre cables 125a, 125b. Here, the pair of optical fibre cables 125a, 125b allow physical redundancy. In some environments, such as a ship or other vessel, damage of to network architecture may occur during commissioned use of this environment. Suitably, the media converter rack module 310 is configured to recognise damaged or poorly performing communications links and to reconfigure the network connections using the provided physical redundant capacity.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

What is claimed is:

1. A fibre-radio communication network, comprising:
a base station; and
at least one wireless access node which is coupled to the base station by one or more fibre optic cables;
wherein the base station comprises:
a switch module arranged to switch Ethernet signals on a local area network; and
a media converter rack module comprising a plurality of media converter units each being arranged to convert between a baseband Ethernet signal carried by the fibre optic cables and an Ethernet digital signal for the switch; and
wherein the wireless access node comprises:

a media converter module which converts between a baseband Ethernet signal carried by the fibre optic cables and an Ethernet digital signal; and a wireless access point module comprising a local modem which converts between the Ethernet signal received over the fibre optic cables and a wireless transmission in a 60 GHz range for wireless communication with a client terminal in the vicinity of the wireless access node, and wherein the wireless access node comprises a housing which contains the media converter module and the wireless access point module together as a single unit, and wherein the housing comprises a transmissive window for transmission of the wireless transmissions in the 60 GHz range, and wherein the wireless access point module is arranged in the housing to align with the transmissive window while being separated from the transmissive window by a gap.

2. The fibre-radio communication network of claim 1 wherein the gap is approximately 1-2 mm.

3. The fibre-radio communication network of claim 1, wherein the wireless access node further comprises an internal cable between the media converter module and the wireless access point module.

4. The fibre-radio communication network of claim 1, wherein the media converter module and the wireless access point module are constructed together as an integrated unit.

5. The fibre-radio communication network of claim 1, wherein the wireless access node provides wireless communications at a centre frequency in the range 57 to 66 GHz.

6. The fibre-radio communication network of claim 1, wherein the base station further comprises a housing arranged to house the media converter rack module and the switch module together as a single unit.

7. The fibre-radio communication network of claim 1, further comprising a management terminal arranged to interrogate a status of the media converter units and to control management functions of the media converter units.

8. The fibre-radio communication network of claim 7, wherein the management terminal is further arranged to interrogate a status of the media converter modules in one or more of the wireless access nodes.

9. A fibre-radio communication apparatus configured as a wireless access node for one or more client terminals, the apparatus comprising:
a media converter module coupled in use to one or more fibre optic cables which converts between a baseband Ethernet signal carried by the fibre optic cables and an Ethernet digital signal; and
a wireless access point module comprising a local modem which converts between the Ethernet signal received over the fibre optic cables and a wireless transmission in a 60 GHz range for wireless communication with the one or more client terminals in the vicinity of the apparatus,
wherein the wireless access node comprises a housing which contains the media converter module and the wireless access point module together as a single unit,
and wherein the housing comprises a transmissive window for transmission of the wireless transmissions in the 60 GHz range,
and wherein the wireless access point module is arranged in the housing to align with the transmissive window while being separated from the transmissive window by a gap.

10. The apparatus of claim 9, wherein the media converter module and the wireless access point module are integrated together as a single unit.

11. A fibre-radio network communication method, comprising:
installing a base station and at least one wireless access node which is coupled to the base station by one or more fibre optic cables;
wherein the base station comprises:
a switch module arranged to switch Ethernet signals on a local area network; and
a media converter rack module comprising a plurality of media converter units each being arranged to convert between a baseband Ethernet signal carried by the fibre optic cables and an Ethernet digital signal for the switch; and
wherein the wireless access node comprises:
a media converter module which converts between a baseband Ethernet signal carried by the fibre optic cables and an Ethernet digital signal; and
a wireless access point module comprising a local modem which converts between the Ethernet digital signal received over the fibre optic cables and a wireless transmission in a 60 GHz range for wireless communication with a client terminal in the vicinity of the wireless access node,
and wherein the wireless access node comprises a housing which contains the media converter module and the wireless access point module together as a single unit,
and wherein the housing comprises a transmissive window for transmission of the wireless transmissions in the 60 GHz range,
and wherein the wireless access point module is arranged in the housing to align with the transmissive window while being separated from the transmissive window by a gap,
and further comprising:
providing the plurality of wireless access nodes for wireless communication in a 60 GHz range with the one or more client terminals in use during a construction phase of a dense modular environment; and
during a commissioned phase of the dense modular environment, providing the plurality of wireless access nodes each in a separable compartment of the dense modular environment for wireless communication in a 60 GHz range with one or more client terminals in that compartment.

12. The method of claim 11, comprising providing boundaries of the compartment which confine a wireless coverage area of the wireless access node in use within the compartment.

13. The method of claim 11 wherein the dense modular environment is a vessel.

14. The method of claim 11, wherein the dense modular environment is a ship.

* * * * *